US012347954B2

(12) United States Patent
Corban et al.

(10) Patent No.: US 12,347,954 B2

(45) Date of Patent: Jul. 1, 2025

(54) HIGH DENSITY ORTHOGONAL CARD EDGE CONNECTOR

(71) Applicants: TE Connectivity Solutions GmbH, Schaffhausen (CH); Tyco Electronics Japan G.K., Kawasaki (JP)

(72) Inventors: Jevon Corban, Middletown, PA (US); Tatsuki Watanabe, Kawasaki (JP); Hikaru Tamura, Kawasaki (JP); Chihiro Hikage, Kawasaki (JP)

(73) Assignees: TE CONNECTIVITY SOLUTIONS GmbH, Schaffhausen (CH); TE CONNECTIVITY JAPAN G.K., Kawasaki (JP)

(*) Notice: Subject to any disclaimer, the term of this patent is extended or adjusted under 35 U.S.C. 154(b) by 405 days.

(21) Appl. No.: 17/882,071

(22) Filed: Aug. 5, 2022

(65) Prior Publication Data

US 2024/0047912 A1 Feb. 8, 2024

(51) Int. Cl.

| | |
|---|---|
| ***H01R 12/73*** | (2011.01) |
| ***H01R 12/70*** | (2011.01) |
| ***H01R 13/627*** | (2006.01) |
| ***H01R 13/631*** | (2006.01) |
| ***H01R 13/6582*** | (2011.01) |

(52) U.S. Cl.

CPC ......... *H01R 12/737* (2013.01); *H01R 12/707* (2013.01); *H01R 13/6273* (2013.01); *H01R 13/631* (2013.01); *H01R 13/6582* (2013.01)

(58) Field of Classification Search

CPC ........... H01R 13/6271; H01R 13/6582; H01R 12/737; H01R 12/707; H01R 13/6273; H01R 13/6272; H01R 13/6581

See application file for complete search history.

(56) References Cited

U.S. PATENT DOCUMENTS

| | | | | |
|---|---|---|---|---|
| 10,020,603 | B1 | 7/2018 | Liu et al. | |
| 10,965,064 | B2 * | 3/2021 | Hsu | H01R 13/6594 |
| 12,088,028 | B2 * | 9/2024 | Lin | H01R 12/7005 |
| 2018/0241154 | A1 * | 8/2018 | Khorrami | H01R 12/737 |
| 2022/0190513 | A1 * | 6/2022 | Henry | H01R 13/6582 |

* cited by examiner

*Primary Examiner* — Renee S Luebke
*Assistant Examiner* — Paul D Baillargeon

(57) ABSTRACT

A connector system having a first connector and a second connector. The first connector is mounted to a substrate and includes a housing and a first shell. The first shell has solder hold down posts which extend from a circuit board mounting surface of the first connector. Securing openings are provided in side walls of the first shell. The second connector includes a daughterboard and a second shell. The second shell has side plates, resilient latching projections are formed from mating connector alignment portions positioned on the side plates proximate a connector receiving surface of the second connector. The resilient latching projections of the second connector cooperate with the securing openings of the first connector to secure the second connector to the first connector. The first connector is secured to the substrate by soldering the solder hold down posts to the substrate.

19 Claims, 5 Drawing Sheets

HIGH DENSITY ORTHOGONAL CARD EDGE CONNECTOR

FIELD OF THE INVENTION

The present invention relates to a high density orthogonal card edge connector. In particular, the invention relates to an orthogonal card edge connector which minimizes the space occupied on a substrate or circuit board.

BACKGROUND OF THE INVENTION

A known signal relay connector has a daughterboard with a first edge having a plurality of first connection pads arranged thereon and a second edge having a plurality of second connection pads arranged thereon. The daughterboard has printed wiring for connecting a first connection pad with a second connection pad. Thus, in the signal relay connector, a signal sent and/or received between a first circuit connected to the first edge and a second circuit connected to the second edge is relayed.

U.S. Pat. No. 6,540,522 discloses an electrical connector assembly serving as such a signal relay connector. The electrical connector assembly has a circuit board equivalent to the daughterboard, a plurality of first connection pads arranged at a lower end edge of the circuit board, and a plurality of second connection pads arranged at a side end edge extending vertically on the circuit board. The electrical connector assembly also has contacts contacting the first connection pads. The periphery of the circuit board is substantially completely enclosed with a housing to constitute the electrical connector assembly. The electrical connector assembly, in its integrally assembled state, has the contacts connected to a motherboard by press-fitting.

U.S. Pat. No. 10,505,302 discloses a connector which has a daughterboard and a metallic shell. The daughterboard has a first edge with first connection pads and a second edge with second connection pads. The first edge is inserted into an on-board connector including first contacts. The on-board connector is mounted on a motherboard and each of the first connection pads is connected to one of the first contacts. The metallic shell has side plates each facing and extending along one of a front board face and a back board face of the daughterboard. Each of the side plates has a base spaced apart from the front board face or the back board face and a retaining portion protruding inward from the base. The retaining portion retains the front board face or a back board face of the daughterboard and has an opening formed around the retaining portion extending through the metallic shell. A fastening portion of the metallic shell extends outward from the metallic shell from a lower end edge of each of the pair of side plates. Mounting hardware cooperates with the fastening portion to fasten the signal relay connector to the motherboard. The need for fastening portions and mounting hardware increases the cost and space needed on the motherboard for proper operation.

It would be beneficial to provide a high density orthogonal card edge connector which reduces the amount of space required on the motherboard and which does not require the use of mounting hardware.

SUMMARY OF THE INVENTION

An embodiment is directed to a connector system having a first connector and a second connector. The first connector is mounted to a substrate and includes a housing, a plurality of conductive terminals and a first shell. The first shell has solder hold down posts which extend from a circuit board mounting surface of the first connector. Securing openings are provided in side walls of the first shell. The second connector includes a daughterboard and a second shell. The second shell has side plates, resilient latching projections are formed from mating connector alignment portions positioned on the side plates proximate a connector receiving surface of the second connector. The resilient latching projections of the second connector cooperate with the securing openings of the first connector to secure the second connector to the first connector. The first connector is secured to the substrate by soldering the solder hold down posts to the substrate.

An embodiment is directed to a connector system having a first connector mounted to a substrate and a second connector mounted to the first connector. The first connector include a housing, a plurality of conductive terminals and a first shell. The first shell has solder hold down posts which extend from a circuit board mounting surface of the first connector. Securing openings are provided in side walls of the first shell. Recesses are provided on inside surface of the side walls of the first shell and extend from the connector receiving surface toward the circuit board mounting surface. The recesses extend about one or more of the securing openings. The second connector includes a daughterboard and a second shell. The second shell has side plates. Resilient latching projections are formed from mating connector alignment portions are positioned on the side plates proximate a connector receiving surface of the second connector. The mating connector alignment portions are configured to have essentially the same dimension as the recesses of the side walls of the first shell.

An embodiment is directed to a connector system having a first shell and a second shell. The first shell has solder hold down post which extend from a circuit board mounting surface of the first shell. Securing openings are provided in side walls of the first shell. Recesses are provided on inside surface of the side walls of the first shell, the recesses extend from the connector receiving surface toward the circuit board mounting surface. The recesses extend about one or more of the securing openings. The second shell has side plates. Resilient latching projections are formed from mating connector alignment portions positioned on the side plates proximate a connector receiving surface of the second shell. The mating connector alignment portions are configured to have essentially the same dimension as the recesses of the side walls of the first shell. Alignment projections are provided on the side plates proximate the connector receiving surface and proximate the mating connector alignment portions.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
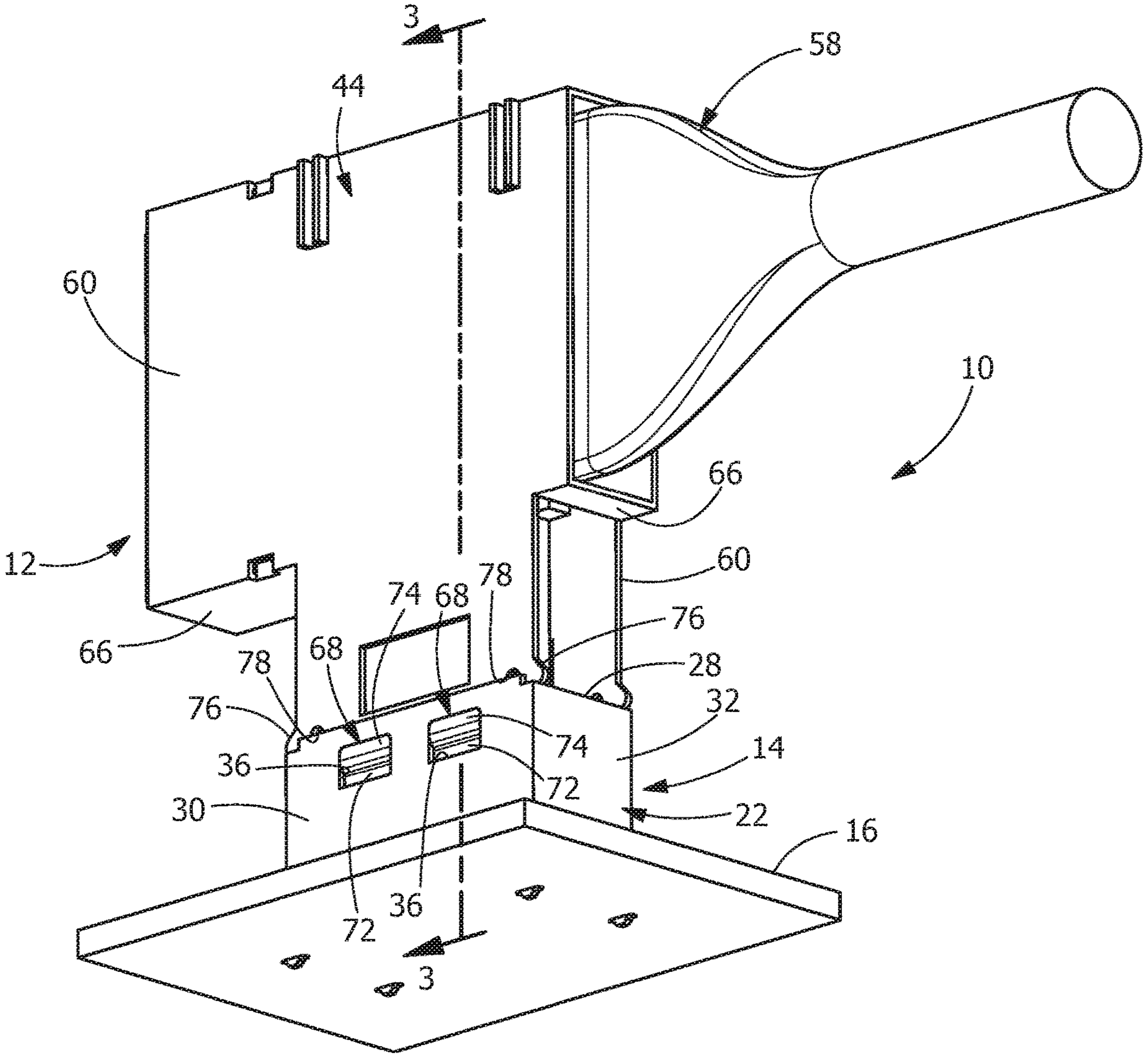
FIG. 1 is a perspective view of an illustrative embodiment of a connector system of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Figure 2:
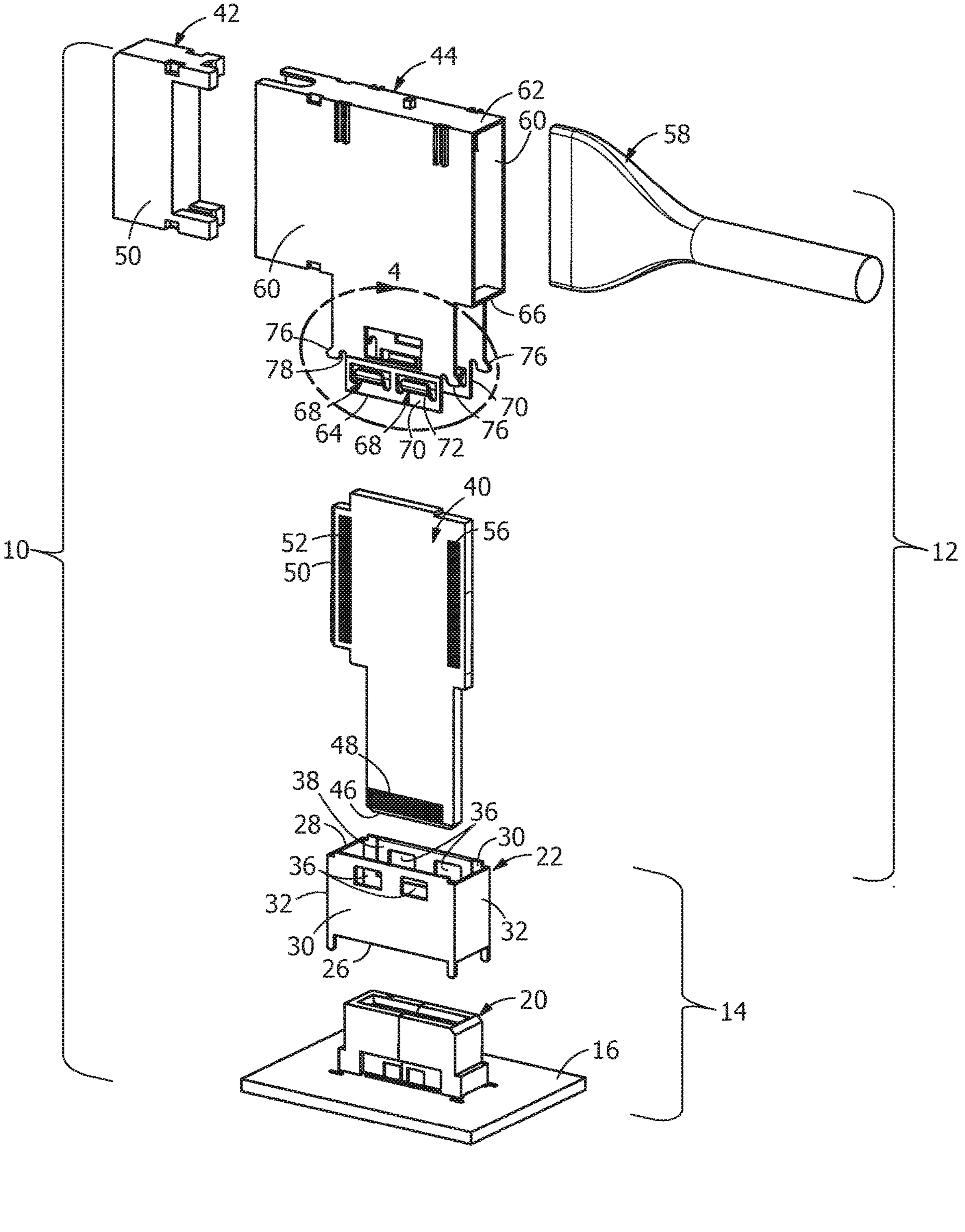
FIG. 2 is an exploded view of the connector system of FIG. 1.
Figure 3:
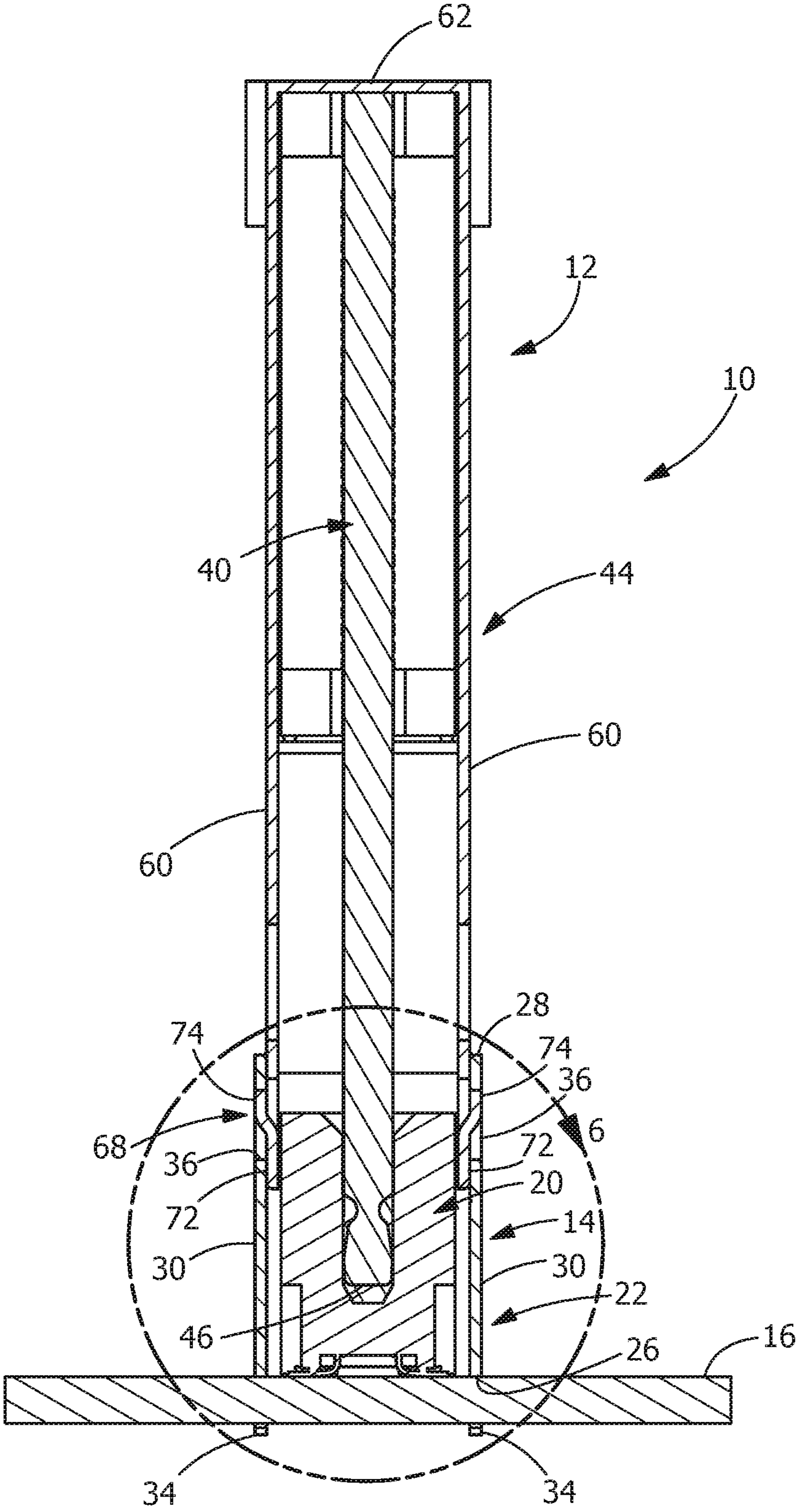
FIG. 3. is a cross-sectional view taken along line 3-3 of FIG. 1.

Referring to FIGS. 1-3, a connector system 10 includes a signal relay connector assembly 12 and an electrical connector 14. The electrical connector is mounted on a circuit board or substrate 16. The connector assembly 12 is matable with the electrical connector 14, as will be more fully described.

Figure 6:
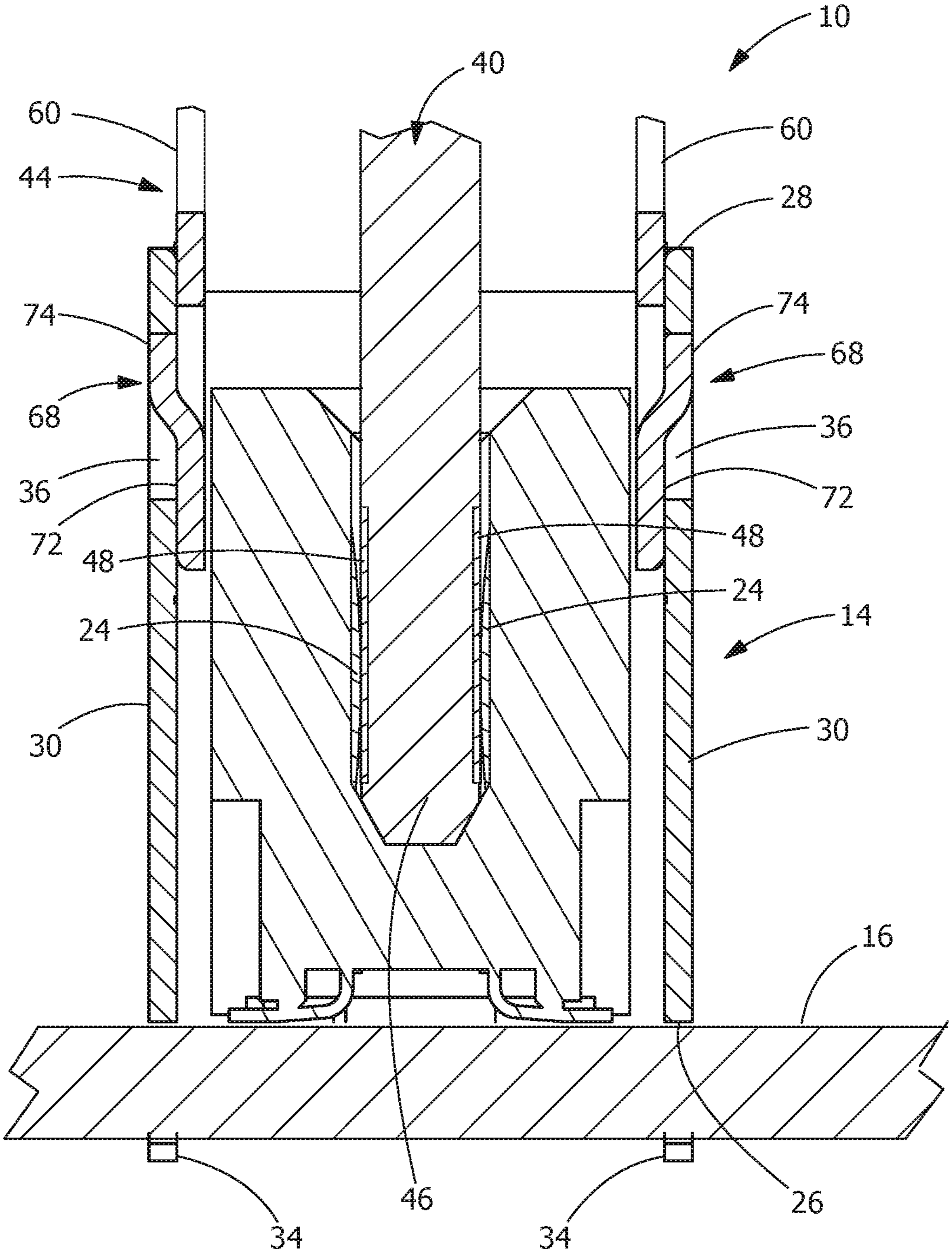
FIG. 6 is an enlarged view of the portion of in the area marked by the dotted line 6 in FIG. 3.

The illustrative connector 14, includes a housing 20, a mounting shell 22 and a plurality of first conductive terminals or contacts 24 (as shown in FIG. 6). The first contacts 24 may be mounted to the circuit board 16 by known methods, including, but not limited to surface mounted or through-hole mounted. The mounting shell 22 may be made of conductive material.

Figure 5:
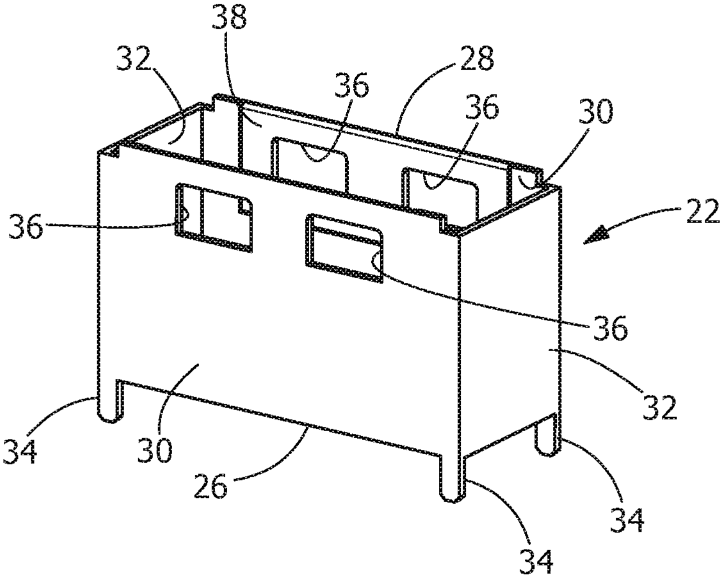
FIG. 5 is an enlarged view of the portion of a shell of a connector in the area marked by the dotted line 5 in FIG. 2.

As shown in FIGS. 2 and 5, the shell 22 has a circuit board mounting surface 26, a connector assembly receiving surface 28. Side walls 30 extend between the mounting surface 26 and the connector assembly receiving surface 28. End walls 32 extend between the mounting surface 26 and the connector assembly receiving surface 28 and between the side walls 30.

Solder hold down posts 34 extend from the circuit board mounting surface 26 in a direction away from the connector assembly receiving surface 28. The solder hold down posts 34 do not extend outside of the perimeter of the side walls 30 and end wall 32. In the illustrative embodiment shown, the solder hold down posts 34 are provide at the corners between the side walls 30 and end wall 32. However, the solder hold down posts 34 may be positioned at other locations.

Securing openings 36 are provided in the side walls 30 proximate the connector assembly receiving surface 28. In the illustrative embodiment shown, two securing openings 36 spaced apart on each of the side walls 30. However, other numbers and positioning of the securing openings 36 may be used.

Recesses 38 are provided on inside surface of the side walls 30. As shown in FIGS. 2 and 5, the recesses 38 extend from the connector assembly receiving surface 28 toward the circuit board mounting surface 26. The recesses 38 extend about one or more of the securing openings 36.

The illustrative signal relay connector assembly 12 includes a circuit board or daughter card 40, at least one connector 42 and a shell 44. The shell 44 may be made of conductive material. An exploded view of the connector assembly 12 is shown in FIG. 2.

The daughterboard 40 has a lower end edge 46 having a plurality of first connection pads 48 arranged thereon and a side end edge 50 having a plurality of second connection pads 52 arranged thereon. Each of the plurality of first connection pads 48 and corresponding one of the plurality of second connection pads 52 are paired and electrically connected together via printed wiring (not shown) on the daughterboard 40. The lower end edge 46 and the side end edge 50 of the daughterboard 40 may also be referred to as a first edge and a second edge, respectively.

When the connector assembly 12 is mated with the connector 14, the lower end edge 46 of the daughterboard 40 is inserted into the connector 14. Each of the plurality of first connection pads 48 arranged on the lower end edge 46 is connected to one of a plurality of first contacts 24 of the connector 14.

The at least one connector 42 may have different configuration. In the illustrative embodiment shown, the at least one connector 42 includes a housing 54 and a plurality of second conductive terminals or contacts (not shown) arranged in the housing 54. The side end edge 50 of the daughterboard 40 is inserted into the at least one connector 42. Thereafter, each of the plurality of second connection pads 52 arranged on the side end edge 50 is soldered to each of the plurality of second contacts of the at least one connector 42.

Third connection pads 56 may also be provided. In the illustrative embodiment shown, the third connection pads 56 are provided to make an electrical connector to a cable connector 58.

With the daughterboard 40 properly mated with the connector 42, the shell 44 is positioned to cover the daughterboard 40 and the connector 42. The shell 44 has a pair of side plates 60 facing and extending along front and back surfaces of the daughterboard 40. The side plates 60 are connected by top plate 62. The side plates 60 extend from the top plate 62 to a connector receiving surface 64. Portions 66 of the side plates 60 are folded to extend between one side plate 60 to the other side plate 60. The top plate 62 and portions 66 cooperate to maintain the spacing of the side plates 60. In addition, the top plate 62, portions 66 and the side plates 60 properly position and maintain the daughterboard 40 and the connector 42. Additional projections or embossments may extend inward from the side plates 60 to maintain the proper positioning of the daughterboard 40 and the connector 42 relative to the shell 44.

Resilient latching projections 68 are formed from mating connector alignment portions 70 on the side plates 60 proximate the connector receiving surface 64. The resilient latching projections 68 have fixed ends 72 and free ends 74. The free ends 74 are positioned outside of the plane of the side plates 60. The fixed ends 70 are positioned closer to the connector receiving surface 64 than the free ends 74. In the illustrative embodiment shown, two resilient latching projections 68 are spaced apart on each of the side plates 60. However, other numbers and positioning of the resilient latching projections 68 may be used. The number and positioning of the resilient latching projections 68 corresponds to the number and positioning of the securing openings 36, as will be more fully described.

The mating connector alignment portions 70 extend from the connector receiving surface 64 of the side plates 60 toward the top plate 62. The mating connector alignment portions 70 are configured to have essentially the same dimension of the recesses 38 of the side walls 30 of the shell 22.

Figure 4:
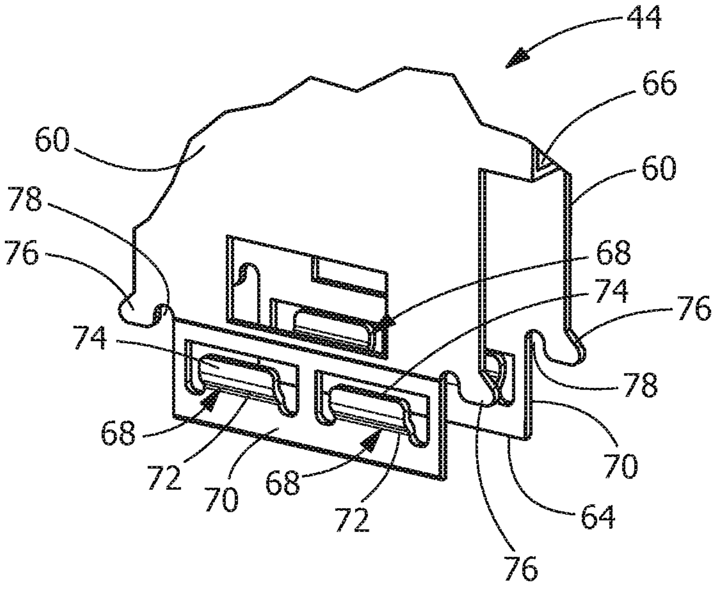
FIG. 4 is an enlarged view of the portion of a shell of a connector assembly in the area marked by the dotted line 4 in FIG. 2.

As shown in FIGS. 1, 2 and 4, alignment projections 76 are provided on the side plates 62 proximate the connector receiving surface 64 and proximate the mating connector alignment portions 70. In the illustrative embodiment shown, two alignment projections 76 are provided on each side plate 62. Alignment recesses 78 are provided between the alignment projections 76 and the mating connector alignment portions 70.

In use, the connector 14 is secured to the circuit board 16 by soldering the solder hold down posts 34 to the circuit board 16. As the solder hold down posts are positioned within the perimeter of the shell 22 of the connector 14, the mounting of the connector 14 to the circuit board 16 does not require more real estate or area of the circuit board than does the connector 14 itself. This allows the connectors 14 and the components mated thereto to closely spaced.

With the connector 14 properly secured to the board 16, the connector assembly 12 is mated with the connector 14 as shown in FIGS. 1, 3 and 6. As this occurs, the connector mating surface 64 of the shell 44 of the connector assembly 12 is moved into alignment with the connector assembly receiving surface 28 of the shell 22 of the connector 14. As the connector assembly 12 is moved toward the connector 14, the mating connector alignment portions 70 provided on the side plates 60 of the shell 44 are moved into the recesses 38 positioned on the side walls 30 of the shell 22. The cooperation of the mating connector alignment portions 70 and the recesses 38 guide the connector assembly 12 into proper position relative to the connector 14.

As mating continues, the plurality of first connection pads 48 on the lower end edge 46 of the daughterboard 40 are positioned between the first contacts 24 of the connector 14. As this occurs, the plurality of first connection pads 48 are provided in electrical and mechanical engagement with the first contacts 24.

As mating occurs, the resilient latching projections 68 on the side plates 60 of shell 44 are moved into the securing openings 36 in the side walls 30 of the shell 22. As this occurs, the free ends 74 are initially resiliently moved inward, in line with the plane of the side plates 60. As the free ends 74 reach the securing openings 36, the free ends 74 return to their unstressed position, in which the free ends 74 are outside of the plane of the side plates 60. In this position, the resilient latching projections 68 extend outside of the plane of the side walls 30 of the shell 22, thereby preventing the unwanted removal of the connector assembly 12 from the connector 14.

The alignment projections 76 also engage the end walls 32 of the shell 22 as mating occurs. The sloped surfaces of the alignment projections 76 help guide the connector assembly 12 into proper alignment with the connector 14 as mating occurs.

When fully mated, the end walls 32 of the shell 22 are positioned in the alignment recesses 76 of the shell 44. In addition, the mating connector alignment portions 76 of the shell 44 engage the walls of the recesses 38 of the shell 22. The cooperation of these components provides for a stable and secure interface, preventing unwanted movement of the connector assembly 12 in a direction which is parallel and perpendicular to the longitudinal axis of the connector 14.

The configuration of the connector 14 and the connector assembly 12 allows the connector assembly 12 to be mounted to the circuit board 16 with the use of hardware. As mounting hardware, such as mounting screws, is costly, the present invention is a more cost effective way to mount the connector assembly 12 to the circuit board 16. In addition, as the mounting footprint of the connector 14 and the connector assembly 12 is provided within the footprint of the connector 14, no additional board real estate is required for mounting. This allow for maximum density of the connectors 14 on the circuit board 16.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A connector system comprising:

a first connector mounted to a substrate, the first connector comprising:
- a housing;
- a plurality of conductive terminals;
- a first shell, the first shell having solder hold down posts which extend from a circuit board mounting surface of the first connector, and securing openings provided in side walls of the first shell;

a second connector assembly comprising:
- a daughterboard,
- a second shell, the second shell having side plates, portions of the side plates being folded to extend between a first side plate of the side plates to a second side plate of the side plates, resilient latching projections are formed from mating connector alignment portions positioned on the side plates proximate a connector receiving surface of the second connector assembly;

wherein the resilient latching projections of the second connector assembly cooperate with the securing openings of the first connector to secure the second connector to the first connector;

wherein the first connector is secured to the substrate by soldering the solder hold down posts to the substrate.

2. The connector system as recited in claim 1, wherein the solder hold down posts do not extend outside of a perimeter of the side walls and an end wall of the first connector.

3. The connector system as recited in claim 2, wherein the securing openings are provided proximate a connector assembly receiving surface of the first connector.

4. The connector system as recited in claim 3, wherein recesses are provided on an inside surface of the side walls of the first shell, the recesses extend from the connector receiving surface toward the circuit board mounting surface, the recesses extend about one or more of the securing openings.

5. The connector system as recited in claim 1, wherein the side plates of the second shell extend along front and back surfaces of the daughterboard, the side plates are connected by a top plate.

6. The connector system as recited in claim 5, wherein the mating connector alignment portions extend from the connector receiving surface of the side plates toward the top plate.

7. The connector system as recited in claim 6, wherein the resilient latching projections have fixed ends and free ends, the free ends are positioned outside of the plane of the side plates, the fixed ends are positioned closer to the connector receiving surface than the free ends.

8. The connector system as recited in claim 7, wherein alignment projections are provided on the side plates proximate the connector receiving surface and proximate the mating connector alignment portions.

9. The connector system as recited in claim 8, wherein alignment recesses are provided between the alignment projections and the mating connector alignment portions.

10. A connector system comprising:
- a first connector mounted to a substrate, the first connector comprising:
  - a housing;
  - a plurality of first conductive terminals;
  - a first shell, the first shell having solder hold down posts which extend from a circuit board mounting surface of the first connector, securing openings provided in side walls of the first shell, recesses provided on an inside surface of the side walls of the first shell, the recesses extending from a connector assembly receiving surface toward the circuit board mounting surface, the recesses extending about one or more of the securing openings;
- a second connector assembly comprising:
  - a daughterboard,
  - a second shell, the second shell having side plates, portions of the side plates being folded to extend between a first side plate of the side plates to a second side plate of the side plate, resilient latching projections formed from mating connector alignment portions positioned on the side plates proximate a connector receiving surface of the second connector assembly, the mating connector alignment portions configured to have essentially same dimensions as the recesses of the side walls of the first shell.

11. The connector system as recited in claim 10, wherein the solder hold down posts do not extend outside of a perimeter of the side walls and an end wall of the first connector.

12. The connector system as recited in claim 11, wherein the securing openings are provided proximate a connector assembly receiving surface of the first connector.

13. The connector system as recited in claim 12, wherein the mating connector alignment portions extend from a connector receiving surface of the side plates toward a top plate.

14. The connector system as recited in claim 13, wherein the resilient latching projections have fixed ends and free ends, the free ends are positioned outside of the plane of the side plates, the fixed ends are positioned closer to the connector receiving surface than the free ends.

15. The connector system as recited in claim 14, wherein alignment projections are provided on the side plates proximate the connector receiving surface and proximate the mating connector alignment portions.

16. The connector system as recited in claim 15, wherein alignment recesses are provided between the alignment projections and the mating connector alignment portions.

17. A connector system comprising:
- a first shell, the first shell having solder hold down posts which extend from a circuit board mounting surface, securing openings provided in side walls of the first shell, recesses provided on an inside surface of the side walls of the first shell, the recesses extending from a connector assembly receiving surface toward the circuit board mounting surface, the recesses extending about one or more of the securing openings;
- a second shell, the second shell having side plates, portions of the side plates being folded to extend between a first side plate of the side plates to a second side plate of the side plate, resilient latching projections formed from mating connector alignment portions positioned on the side plates proximate a connector receiving surface, the mating connector alignment portions configured to have essentially same dimensions as the recesses of the side walls of the first shell, alignment projections provided on the side plates proximate the connector receiving surface and proximate the mating connector alignment portions.

18. The connector system as recited in claim 17, wherein the solder hold down posts do not extend outside of a perimeter of the side walls and an end wall of the first shell.

19. The connector system as recited in claim 18, wherein alignment recesses are provided between the alignment projections and the mating connector alignment portions.

* * * * *